US008248658B2

(12) United States Patent
Morgan

(10) Patent No.: US 8,248,658 B2
(45) Date of Patent: Aug. 21, 2012

(54) IMAGING APPARATUS WITH SHEET SIZE MEASURING DEVICE

(75) Inventor: Curt Morgan, Superior, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 718 days.

(21) Appl. No.: 12/416,142

(22) Filed: Mar. 31, 2009

(65) Prior Publication Data

US 2010/0245859 A1  Sep. 30, 2010

(51) Int. Cl.
H04N 1/40  (2006.01)
(52) U.S. Cl. ............................ 358/2.1; 358/498; 358/468
(58) Field of Classification Search .................. 358/449, 358/488, 1.9, 2.1, 498, 396, 304, 468, 406, 358/504, 296
See application file for complete search history.

(56) References Cited

U.S. PATENT DOCUMENTS

| 5,008,709 | A  | * | 4/1991  | Shinada et al. | 399/86  |
| 7,306,221 | B2 | * | 12/2007 | Agata          | 271/251 |
| 7,445,208 | B2 | * | 11/2008 | Onodera        | 271/239 |

* cited by examiner

Primary Examiner — Thomas D Lee
Assistant Examiner — Stephen M Brinich
(74) Attorney, Agent, or Firm — Finnegan, Henderson, Farabow, Garrett & Dunner, L.L.P.

(57) ABSTRACT

An imaging apparatus for forming the image on a sheet, wherein the imaging apparatus includes a sheet-feeding path for conveying the sheet, a detecting section positioned along the sheet-feeding path, which detects a leading edge, a trailing edge and a side edge of the sheet while the sheet is being conveyed along the sheet-feeding path, a controller for registering dimensions, a memory for storing data of dimensions wherein when a auto-measurement mode is set in the controller, the controller controls the detecting section so as to detect the leading edge, the trailing edge and the side edge of the sheet while the sheet is being conveyed along the sheet-feeding path and obtains a length and a width of the sheet, and then the controller registers the length and the width of the sheet to be stored in the memory.

23 Claims, 14 Drawing Sheets

| NAME | LENGTH | WIDTH |
|---|---|---|
| Custom1 | 23.1 | 5.9 |
| Drawer3 | 19.5 | 9.8 |
| Special1 | 14.6 | 5.5 |
| Custom2 | 21.7 | 7.2 |
| Shelf1 | 45.8 | 12.5 |
| Drawer2 | 25.6 | 7.6 |
| Shelf4 | 52.5 | 12.5 |
|  | 27.3 | 8.4 |

IMAGING APPARATUS WITH SHEET SIZE MEASURING DEVICE

BACKGROUND OF THE INVENTION

1. Technical Field

This invention is related to the field of printing, and in particular to printers with a paper path and paper detection sensors on the paper path.

2. Description of Related Art

Generally, setting or resetting of some parts or operational programming of a printer is necessary before a sheet is fed through the printer in order to correctly determine jamming of the sheet or printing errors in the apparatus. For this setting of the imaging apparatus, input of information about the length and/or width of the sheet to be fed is required in advance.

Recently, there are more demands to print texts or images on irregular-sized sheets, especially on long-sized sheets (hereinafter referred to as banner sheets) to make a signboard or others for instance.

In case where the size of sheets is irregular, the user usually needs to measure the length and width of one of the sheets in a sheet-feeding tray provided in the apparatus and inputs the dimensions using a keyboard on the apparatus. Actually this manual work is troublesome and is often accompanied with measurement error of the length and width. Further, this work may need, for example, a scale, a long table and the space for the measurement. Besides, there may be sometimes a long sheet whose length is difficult to measure manually and precisely.

Here, an irregular-sized sheet is intended to mean at least one of whose length and width are not the length and width of the regular-sized sheet such as of the A4 size, the letter size and the legal size, while a long-sized sheet is intended to mean a sheet at least whose length in the sheet feeding direction in the apparatus is longer than regular sized-sheets.

Conventionally, an image forming apparatus, which has a measuring system for the regular-sized sheets, has been disclosed in U.S. Pat. No. 7,164,881, for example. This image forming apparatus selects types of sheets such as an A4 size sheet, a letter size sheet and a legal size sheet by measurement of the length of the sheet while the sheet is being fed in the apparatus. To be more specific, data pertaining to sheet length in the sheet feeding direction for regular-sized sheets have been installed in the imaging apparatus in advance. The sheet length is measured while the sheet is being fed in the apparatus, and the acquired dimensions are compared with the stored data of the sheet length to find the regular-sized sheet corresponding to the obtained dimension Then, one of the regular-sized sheets is selected as default media for future operations.

Needless to say that this type of apparatus devised for the regular-sized sheets is not available for irregular-sized sheet especially for long-sized sheets, since the image forming apparatus has no idea about the dimensional information of the irregular paper in advance.

SUMMARY

To solve the above-mentioned problems, an object of the invention is providing an imaging system, an imaging apparatus and imaging method in which the length and width of an irregular-sized sheet are measured while the sheet is conveyed in the apparatus and the obtained length and width are registered.

The object can be achieved by the following structures.

(1) An imaging system for forming an image on a sheet, which includes a computer for creating data of an image for printing and an imaging apparatus for forming the image on a sheet, wherein the imaging apparatus includes a sheet-feeding path for conveying the sheet, a detecting section positioned along the sheet-feeding path, which detects a leading edge, a trailing edge and side edge of the sheet while the sheet is being conveyed along the sheet-feeding path, a controller for registering a dimension, a memory for storing data of dimensions, wherein the detecting section detects the leading edge, the trailing edge and side edge of the sheet while the sheet is being conveyed along the sheet-feeding path and the controller obtains a length and a width of the sheet, and then the controller registers the length and width of the sheet to be stored in the memory.

(2) An imaging apparatus for forming an image on a sheet, which includes a sheet-feeding path for conveying the sheet, a detecting section positioned along the sheet-feeding path, which detects a leading edge, a trailing edge and a side edge of the sheet while the sheet is being conveyed along the sheet-feeding path, a controller for registering a dimension, a memory for storing data of dimensions, wherein, the detecting section detects the leading edge, the trailing edge and the side edge of the sheet while the sheet is being conveyed along the sheet-feeding path and the controller obtains a length and a width of the sheet, and then the controller registers the length and width of the sheet to be stored in the memory.

(3) An imaging method for forming an image on a sheet, which includes the steps of conveying the sheet along a sheet-feeding path, detecting a leading edge, a trailing edge and a side edge of the sheet while the sheet is being conveyed along the sheet-feeding path, obtaining a length and a width of the sheet, and registering the length and the width of the sheet to be stored in a memory.

DETAILED DESCRIPTION OF THE PREFERRED EMBODIMENTS

The followings are detailed description of embodiments of the present invention.

Embodiment 1

Figure 1A:
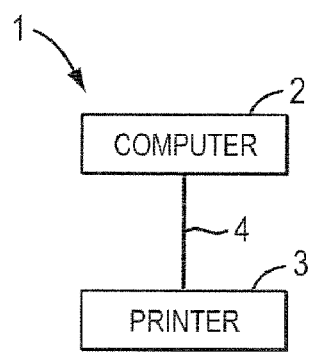
FIGS. 1(a) and 1(b) show the printing system of an embodiment of the present invention.
Figure 1B:
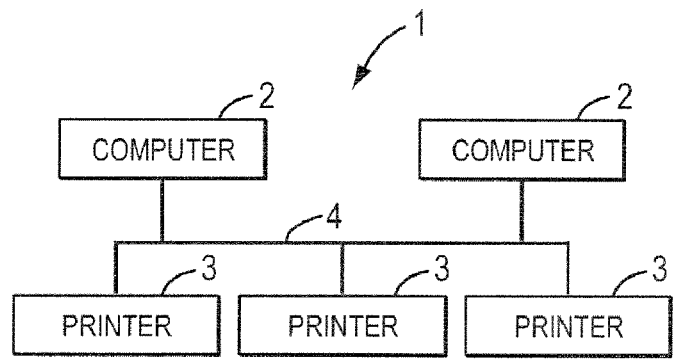

FIGS. 1(a) and 1(b) each show a computer system 1 of an exemplary embodiment of the present invention. The computer system 1 includes a computer 2 and at least one printer 3 which are connected each other by a data communication line 4. The data communication line can be an independent line (FIG. 1(a)) such as a bidirectional parallel bus, a USB® (Universal Serial Bus) or the like, or can be a network (FIG. 1(b)), such as Ethernet, FDDI (Fiber-Distributed Data Interface) or the like, so as to communicate with each other.
(Configuration Inside the Computer 2)

Figure 2:
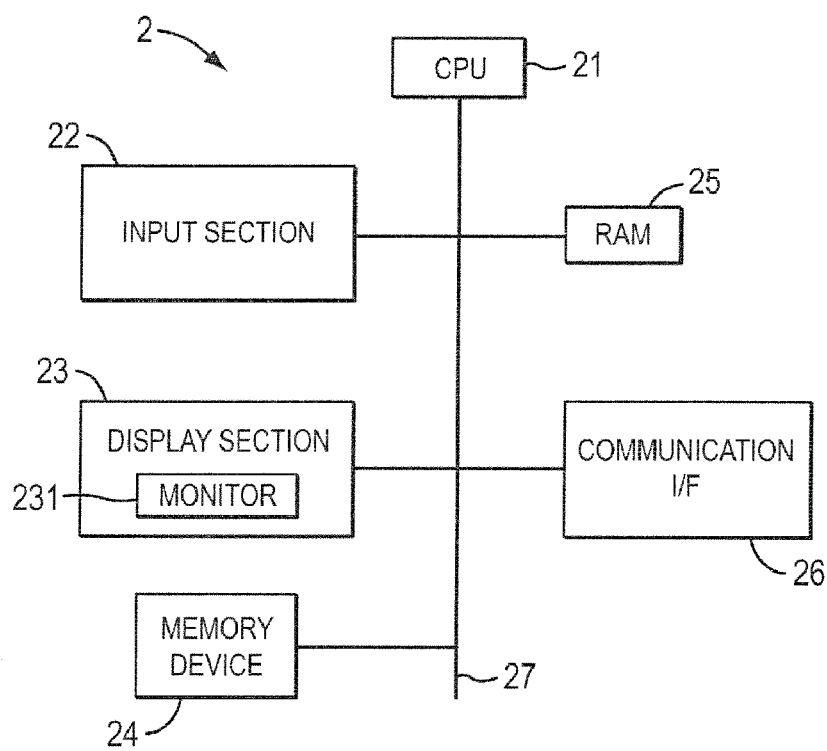
FIG. 2 is a schematic diagram of the configuration inside a computer according to an embodiment.

FIG. 2 shows schematic diagram of configuration inside the computer 2 in the computer system 1. The configuration inside computer 2 will be described referring to FIG. 2.

The computer 2 includes a CPU 21, an input section 22, a display section 23, a memory device 24, a RAM 25 and communication interface ("I/F") 26. These devices are connected with an internal bus 27.

The CPU 21 controls entire sections of the computer 2 and executes various programs including an operating system (OS) and application programs and the input section 22 is composed of a keyboard, mouse or the like with which instructions to the CPU 21 is inputted from a user. The display section 23 is represented by the computer monitor 231 which displays various types of information thereon.

The memory device 24 such as a hard disk stores the OS and various application programs including printing programs according to an embodiment of the present invention to be described later.

The RAM 25 works as a work area of the CPU 21 to execute the OS and application programs stored in the memory device 24. The CPU 21 also uses the RAM 25 to store various types of programs and data therein to carry out various services.

The communication I/F 26 is provided to communicate with the printer 3 through the independent line (FIG. 1(a)) or the network (FIG. 1(b)) as the data communication line 4.
(Configuration Inside the Printer 3)

Figure 3:
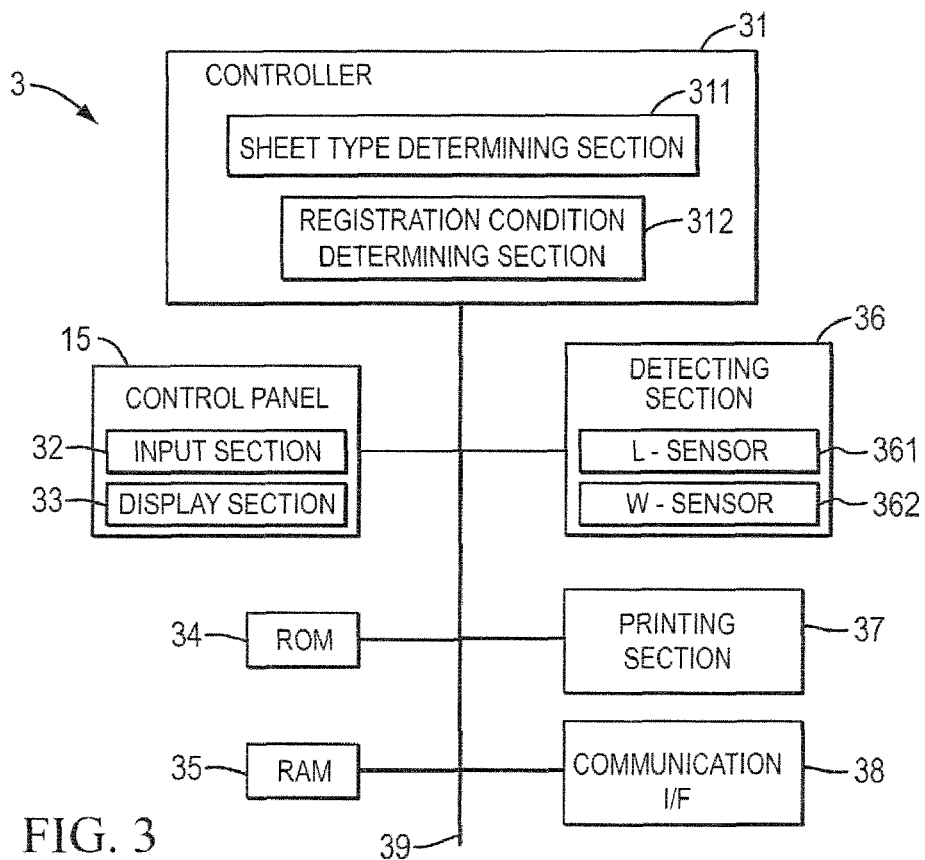
FIG. 3 is a schematic diagram of the configuration inside a printer according to an embodiment.

FIG. 3 shows a schematic diagram of configuration inside printer 3 in the computer system 1 according to one embodiment of the present invention. The configuration inside the printer 3 will be described referring to FIG. 3.

The printer 3 includes a controller 31, an input section 32, a display section 33, a ROM 34, a RAM 35, a detecting section 36, a printing section 37 and a communication I/F 38. These devices are connected with an internal bus 39.

The input section 32 is provided in a control panel 15 on an upper part of the printer 3 and used for inputting instructions to the controller 31 or for configuring the print conditions of the printer 3.

The display section 33 is also provided in the control panel 15 on an upper part of the printer 3 to display various types of information thereon such as the configured conditions or current operation status of the printer 3.

As memories, ROM 34 and RAM 35 are provided in the printer 3 as a permanent storage of operational programs and as a temporary storage of data or instructions.

The detecting section 36 is represented by L-sensor 361 to detect a leading edge and a trailing edge of the sheet being conveyed for measuring the length of the sheet and W-sensor 362 to detect a side edge of the sheet being conveyed for measuring the width of the sheet.

The printing section 37 is composed of hardware devices actuated by the controller 31 to form an image on a sheet.

The communication I/F 38 is provided to communicate with the computer 2 through the independent line (FIG. 1(a)) or the network (FIG. 1(a)) as the data communication line 4. The computer 2 transmits print job including data of an object and instruction data to the printer 3 through the data communication line 4.
(Structure of the Printer)

Figure 4:
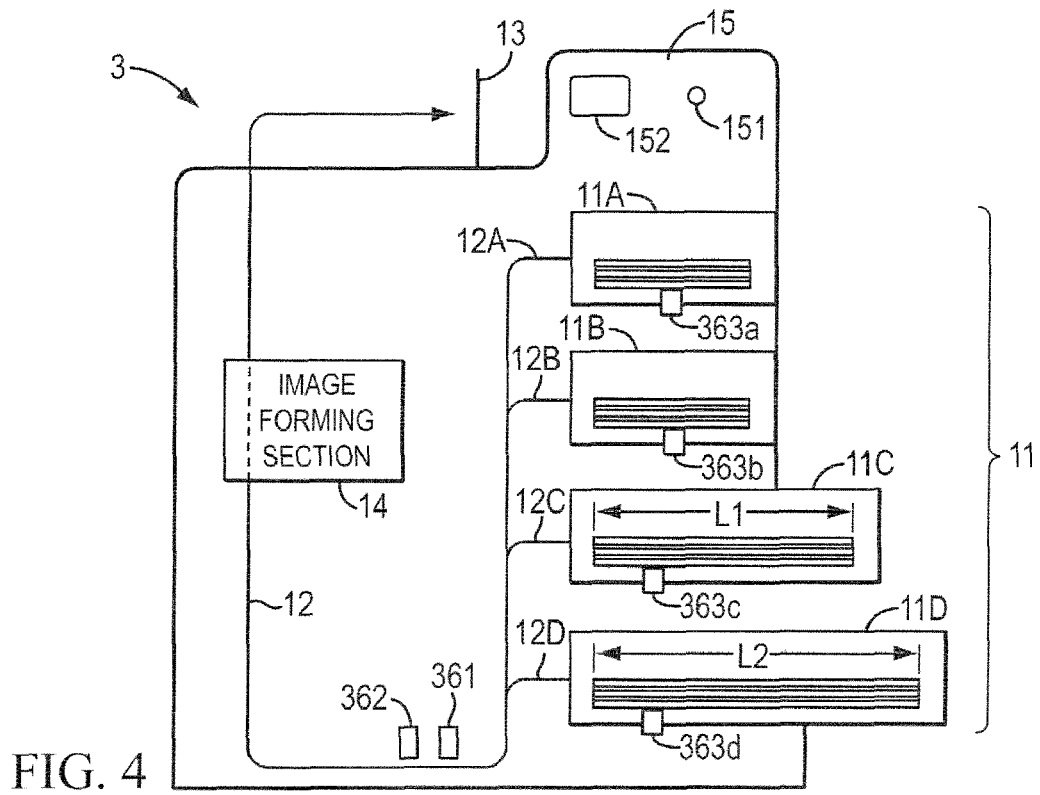
FIG. 4 is a cross-sectional view of a printer according to the embodiment.

FIG. 4 shows a cross-sectional view of a printer 3 according to the embodiment, which prints images on various types of sheets. The structure of printer 3 will be described referring to FIG. 4.

The printer 3 has plural sheet-feeding trays 11 each of which contains a pile of sheets having the same type, but the types of sheets can be different among the sheet-feeding trays 11.

In this particular exemplary embodiment, four sheet-feeding trays 11A, 11B, 11C and 11D are provided in the printer. To be more specific, the trays 11A, 11B, 11C, and 11D respectively accommodate A4 sized sheets (regular-sized sheets), letter sized sheets (regular-sized sheets), banner sheets (irregular-sized sheets), and banner sheets (irregular-sized sheets) longer in length than ones in the tray 11C. Of course, this invention can also be applied to a printer 3 having only a single sheet-feeding tray.

The printer 3 also has a sheet-feeding path 12 to convey sheets from the sheet-feeding tray 11 to an ejection tray 13 through image forming section 14. A sheet fed from the tray 11A is conveyed through a path 12a which joins to the sheet-feeding path 12. Similarly, paths 12b, 12c and 12d join to the sheet-feeding path 12 to feed sheets from tray 11B, 11C and 11D into the sheet-feeding path 12 respectively as shown in FIG. 4. The L-sensor 361 and W-sensor 362 are provided along the sheet-feeding path 12.

The image forming section 14 can employ any type of known image forming method. For instance, the image forming section 14 may employ an electrophotographic process, which is composed of a photoconductive drum, an exposure section, an image developing section, an image transfer section, and an image fixing section for example.

The input section 32 in the control panel 15 includes various types of setting buttons for operating the printer and a monitor screen 152 for showing current apparatus condition, current setting conditions or others.

Some of the setting buttons are, for example, for selection of the type of sheets among the regular-sized sheets for registration of the selected type of sheet.

For irregular sized sheets, among the buttons in the input section 32, an auto-measurement button 151 is provided for the user to set the auto-measurement mode in which the sheet length and width are automatically measured while a sheet is being fed through the printer for registration of the length and width.

As detecting devices, not only the L-sensor 361 and the W-sensor 362 but also sensors 363a, 363b, 363c and 363d may be provided on the trays 11 for detecting existence of sheets as an option.
(Sensors for Measurement of the Sheet Length and Width)
[Sensor for Length]

Examples of the configuration of the L-sensor 361 to be used for measuring the sheet length in the sheet feeding direction will be described referring to FIG. 5.

Figure 5:
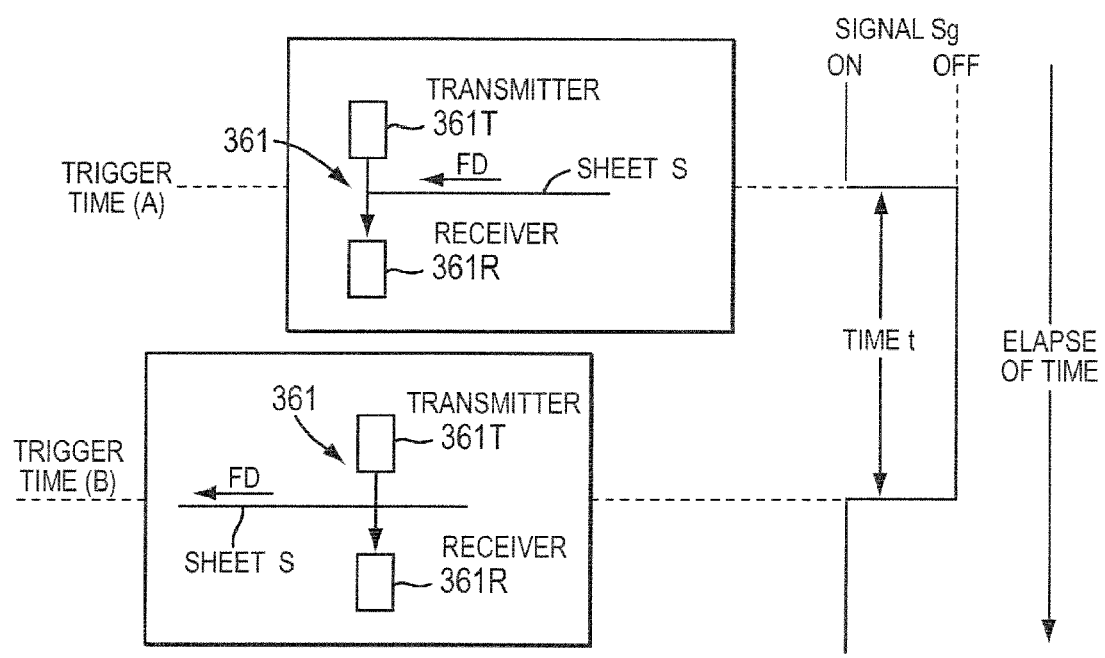
FIG. 5 shows an example of the sheet length measuring sensor.

FIG. 5 shows an example of L-sensor 361 to be used for measurement of the sheet length while the sheet is being conveyed in the sheet-feeding path 12. The L-sensor 361 is positioned near and downstream of the joining point of the path 12d and the sheet-feeding path 12 as shown in FIG. 4.

In this case, an example of use of an optical sensor is described, which is not limited to in the embodiment of the present invention. The optical L-sensor 361 is composed of a light transmitter 361T and a light receiver 361R. When the receiver 361R receives light transmitted from the transmitter 361T, an ON-signal Sg is issued from the receiver 361R. On the other hands, when the receiver 361R does not receive light transmitted from the transmitter 361T, an OFF-signal Sg is issued from the receiver 361R.

Before the leading edge of the sheet S arrives at the L-sensor 361, the signal Sg is ON. Then, by the arrival of the sheet, the light is shielded by the leading edge of the sheet at the trigger time (A) and the signal Sg is changed from ON to OFF. Next, the sheet is fed further in the sheet feeding direction FD and the trailing edge comes to the position of the L-sensor 361, the light shield is removed and the signal Sg is changed from OFF to ON at the trigger time (B). The length can be obtained from the time "t" between the trigger time (A) and trigger time (B).

To be more specific, in this case, the time between changes of signals at the trigger time (A) and the trigger time (B) caused by the leading edge and the trailing edge of the sheet is converted into a dimension by calculation in consideration of the feeding speed of the sheet S at this position.

Needless to say, a contacting switch such as a limit switch or other types of switches can be used instead.

Inherently some sensors are often provided for detecting the arrival of the sheet at a certain position along the sheet-feeding path 12 to send signals to some devices positioned on the downstream side of the sensor for preparation for accepting the sheet, or to send signals to some devices positioned on the upstream side of the sensor for resetting and preparation for accepting the subsequent sheet. Therefore, the existing sensor for detecting the sheet may be used for this purpose.

Further, the sheet-feeding path 12 of the printer 3 is often provided with plural sensors for obtaining sheet positions for control of the printer 3 as mentioned above so that double check of the sheet length is also possible by using plural different sensors. In this case, an average value of some measured dimensions may be regarded as the dimension of the sheet length to acquire more precise length.

As mentioned before, the sensor can be a photo-detector type, a limit switch type or any other type to detect the leading edge and trailing edge while the sheet is being conveyed.

Of course, this system can be used for not only banner sheets but also short sheets which have a length different from lengths of the regular-sized sheets in the sheet feeding direction.

[Sensor for Width]

Regarding a W-sensor 362 which detects a side edge or both side edges to measure the width of sheet while the sheet is conveyed along the sheet feeding path 12, a conventional sensor can be employed. For example, an optical sensor which is composed of a transmitter and a receiver similar to L-sensor 361 and has an optical sensor array including plural sensors can be employed. The optical sensor array extends perpendicular to the sheet feeding direction FD and covers the total variation of a position of the sheet side edge or positions of the sheet both side edges of the sheet being fed along the sheet-feeding path 12. The width is calculated from the edge position or edge positions.

Alternatively, in case of using a manual feed tray, sliding guide plates which can change the distance between the plates and each of which comes in contact with each side of sheets on the sheet-feeding tray can be used for measurement of the width of the sheets.

(Procedure for Sheet Size Registration)

Figure 6A:
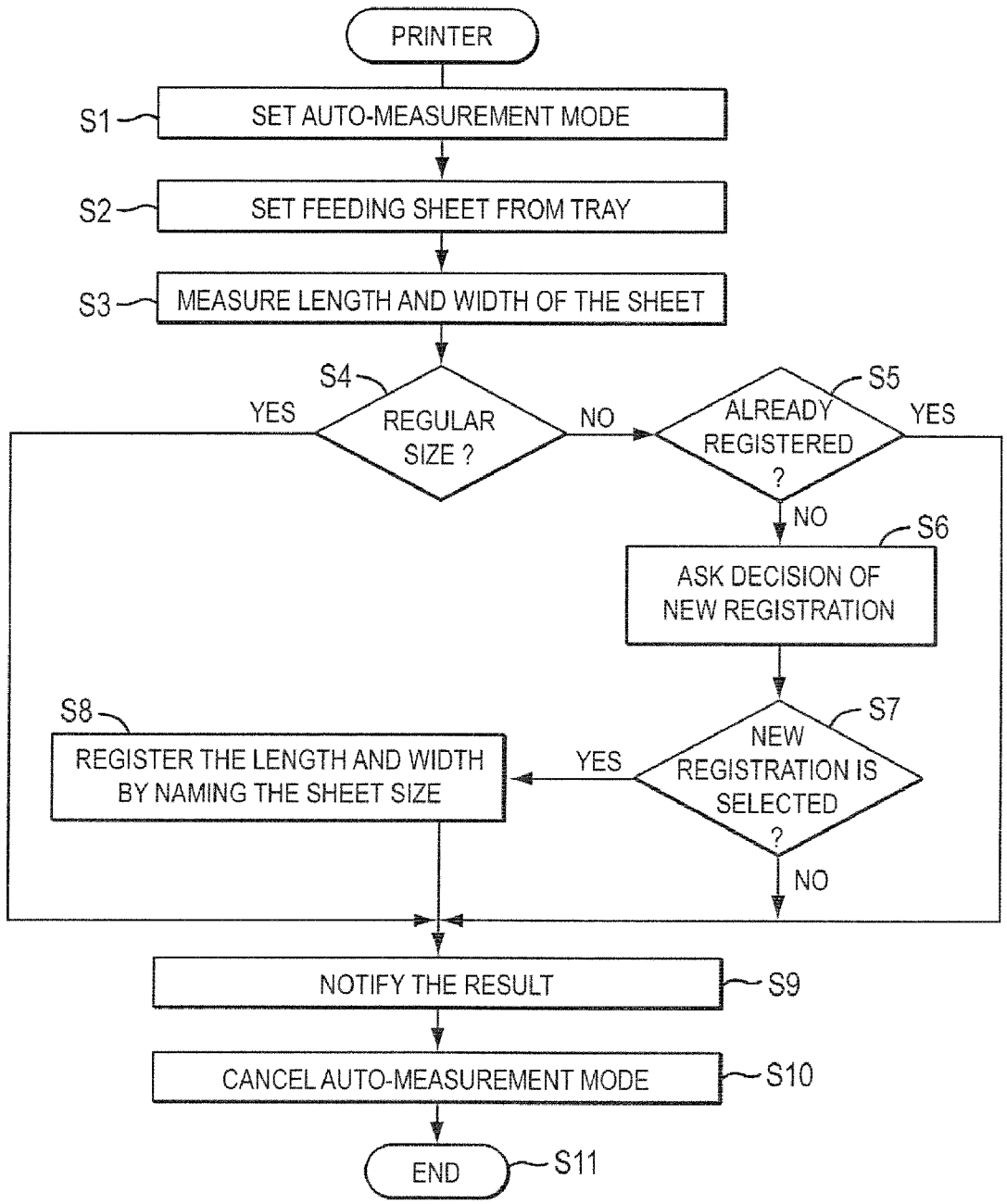
FIGS. 6(a) and 6(b) are flowcharts each showing an operation flow of an embodiment.

The procedure for the sheet size registration of the embodiment will be described referring to FIG. 6(a) which is a flowchart showing an operation flow for the sheet size registration of the embodiment.

At the initiation stage, after the user installs a sheet or sheets on the trays 11 of the printer 3, the measurement of the sheet size and registration of the sheet size in the auto-measurement mode is conducted as follows.

The user installs a set of sheets whose sheet size may be unknown on one of the trays 11, and selects a button corresponding to the tray 11.

Then the user sets the auto-measurement mode by depressing the auto-measurement button 151 (Step S1). A sheet in the tray 11 starts to be fed through the printer as a testing sheet (Step S2) and an L-sensor 361 detects the leading edge of the sheet and trailing edge of the sheet and W-sensor 362 detects a side edge or both side edges of the sheet while the sheet is being conveyed along the sheet-feeding path in order to measure the length and width of the sheet to obtain a dimension L1 and a width W1 (Step S3) Then, a sheet type determining section 311 (FIG. 3) in the controller 31 judges whether the sheet is regular sized-sheet or not (Step S4) based both on the measured dimensional information and stored dimensional information of regular sized sheets. The sheet type determining section 311 is configured by using a conventional art such as an art disclosed in U.S. Pat. No. 7,164,881, the content of which is hereby incorporated by reference.

If the sheet size is determined to be a regular size (Step S4: Yes), the result of the judgment is notified on the screen 152. If the sheet size is determined not to be a regular size (Step S4: NO), a registration condition determining section 312 (FIG. 3) in the controller 31 judges whether the size has been already registered or not (Step S5). In Step S5, the measured length and width are compared with dimensions of length and width which have been already registered and judged whether the measured set of dimensions are the same as one of the sets of dimensions which have been already registered in consideration of suitable tolerances of the dimensions.

If the size has been already registered (Step S5: YES), the result is notified on the screen 152. If the size has not been registered yet (Step S5: NO), a notice appears on the screen 152 on the control panel 15. The notice is for example, for asking the user whether the measured size will be newly registered or not (Step S6). In Step S7, decisions are made by the user and if the user does not select the registration (Step S7: NO), a notice including information of the measured sheet size dimensions appears on the screen 152 (Step S9).

If the user selects the registration (Step S7: YES), the length and width are registered (Step S8). Then a notice including information of the measured sheet size appears on the screen 152 (Step S9). Next, the auto-measurement mode is cancelled (Step S10) to end the operation (Step S11).

Figure 7:
FIG. 7 shows an example of a size list according to the embodiment.
Figure 8A:
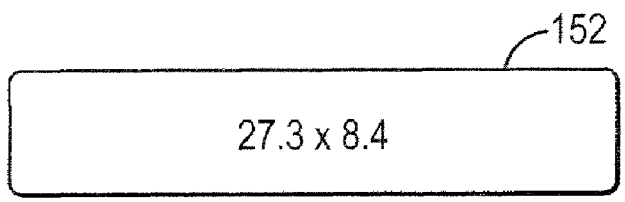
FIGS. 8(a) and 8(b) show examples of display of a monitor screen on the printer.
Figure 8B:
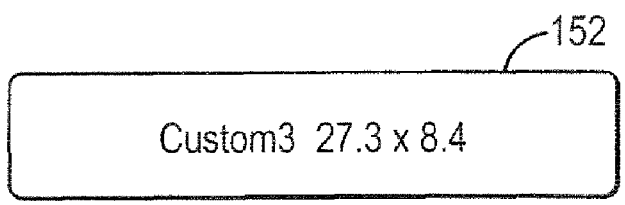

In Step S8, to be more specific, the RAM 35 includes a list of sizes (lengths and widths) of sheets therein and the newly registered sizes are added to the size list SL. FIG. 7 shows an example of the size list SL. The measured dimensions in inch unit are automatically added in the size list SL with a blank name block beside the dimensions and the user names the size which has been newly registered by the controller 31. On the screen 152, one line of the size list which was added last is displayed as shown in FIG. 8(a). The user inputs a name according the user's decision of the name and registers it by pushing a register button or the like. For example, a name "Custom 3" has been inputted in the blank name block as shown in FIG. 8(b). Then, the registration of the size of the sheet has been completed. Storage places where the sheets are stored can be the name such as "Drawer 3" or "Shelf 1" for the convenience to find the sheet.

Regarding the information of the size list SL on the screen 152 in the control panel 15, the list can be scrolled to view other records of the list.

After the registration of the size of the sheets is completed, the size list SL including dimensions of the length and width and the name can be viewed on the computer screen 231 and/or the screen 152 on the control panel 15 of the printer 3.

In this case, the image forming section 14 is disabled during this mode, since this section 14 is not necessary for conveying the sheet and measuring the length and width.

Of course, the control panel 11 also can be provided with conventional setting buttons for inputting manually measured dimensions of length and width of the sheet manually.

(Procedure for Printing Operation)

Figure 6B:
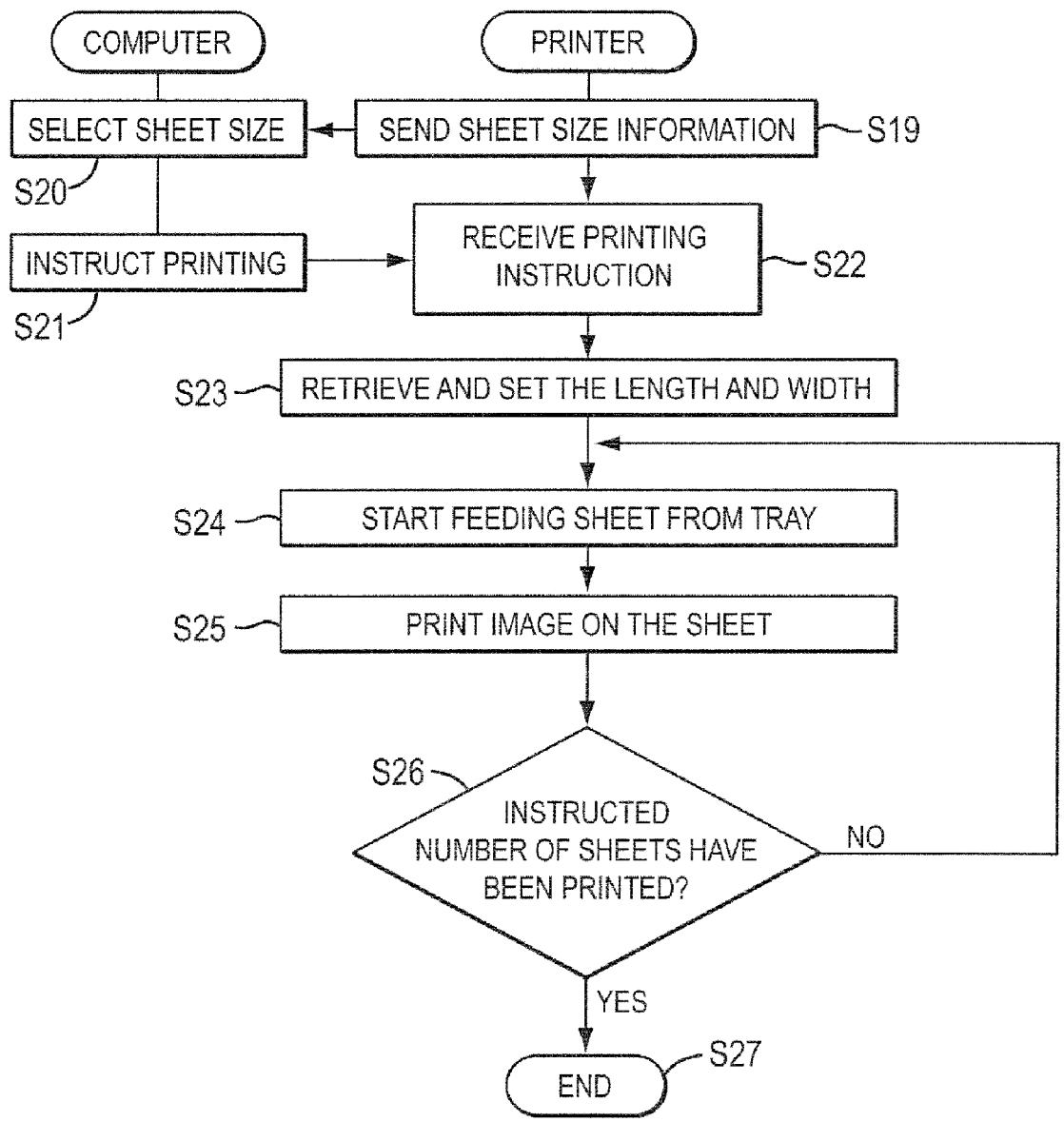

The procedure for the printing operation of the embodiment will be described referring to FIG. 6(b) which is a flowchart showing an operation flow for printing operation of the embodiment.

First of all, the user operates the computer 2 to find a sheet size suitable for the image to be printed. The CPU 21 in the computer calls and executes the printer driver corresponding to the printer 3 installed in the computer 2 for controlling the printer 3 to send information about the size list stored in RAM 35 to the computer 2 through the data communication line 4 (Step S19) Next, the user checks, on the monitor 231 of the computer 2, the size list SL to find a sheet size suitable for the image to be printed. In a illustrative example, "Custom 2" which has length L=21.7 and width W=7.2 is selected from the size list SL, for example on the monitor 231 of the computer 2 (Step S20), and the user installs a set of the sheet having the size named "Custom 2" on one of the trays 11.

When the user instructs to start printing through the computer 2 (Step S21), the data of the selected size as well as image data are converted into a form of a PDL (Page Description Language) and sent to and received by the printer 3 as a print job through the data communication line 4 (Step S22). The length L and width W are automatically retrieved from the RAM 35 based on the data of the selected size and setting of the printer is carried out according to the length L and width W (Step S23) The printer is adjusted according to the set length and width to adapt the devices or programs in the printer to the length and width so that the printer can accept the sheet having the length and width without problems, for example, by changing sheet feeding timing to keep a suitable interval between sheets or by changing a distance between sheet guide plates. Then, the printer 3 starts feeding a sheet from the tray 11 (Step S24) and prints an image on it after parsing and rasterizing the print job to generate printable bitmap image data (Step S25). If the sheets of the instructed number have not been printed (Step S26: NO), the operation flow returns to Step S24. If the sheets of the instructed number have been printed (Step S26: YES), the operation ends (Step S27).

Embodiment 2

Figure 9:
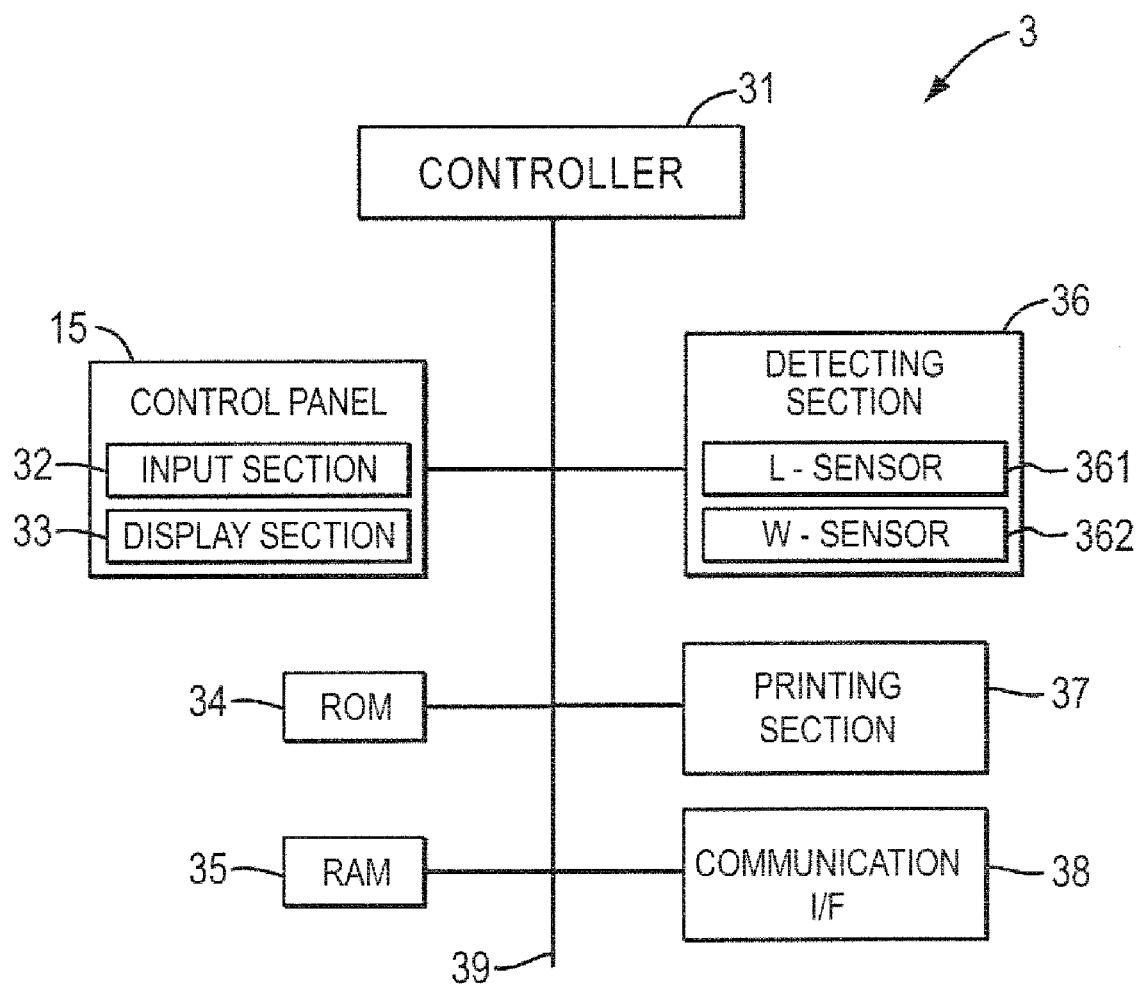
FIG. 9 is a schematic diagram of the configuration inside a printer according to an embodiment.

FIG. 9 shows a schematic diagram of configuration inside printer 3 in the printing system 1 according to Embodiment 2. In Embodiment 2, the dimensions of the measured length and width are registered correlating with sheet-feeding trays 11. Note that description of common parts to the Embodiment 1 will be omitted from the following explanations.

Some of the setting buttons in the control panel 15 are, for example, for selection of the type of sheets among the regular-sized sheets for each tray 11 for registration of the selected type of sheet for each tray 11 as a default type of sheet.

For irregular sized sheets, among the buttons in the input section 32, an auto-measurement button 151 is provided for the user to set the auto-measurement mode in which the sheet length and width are automatically measured while a sheet is being fed through the printer for registration of the length and width for each tray 11 as a default size.

(Procedure for Sheet Size Registration)

Figure 10A:
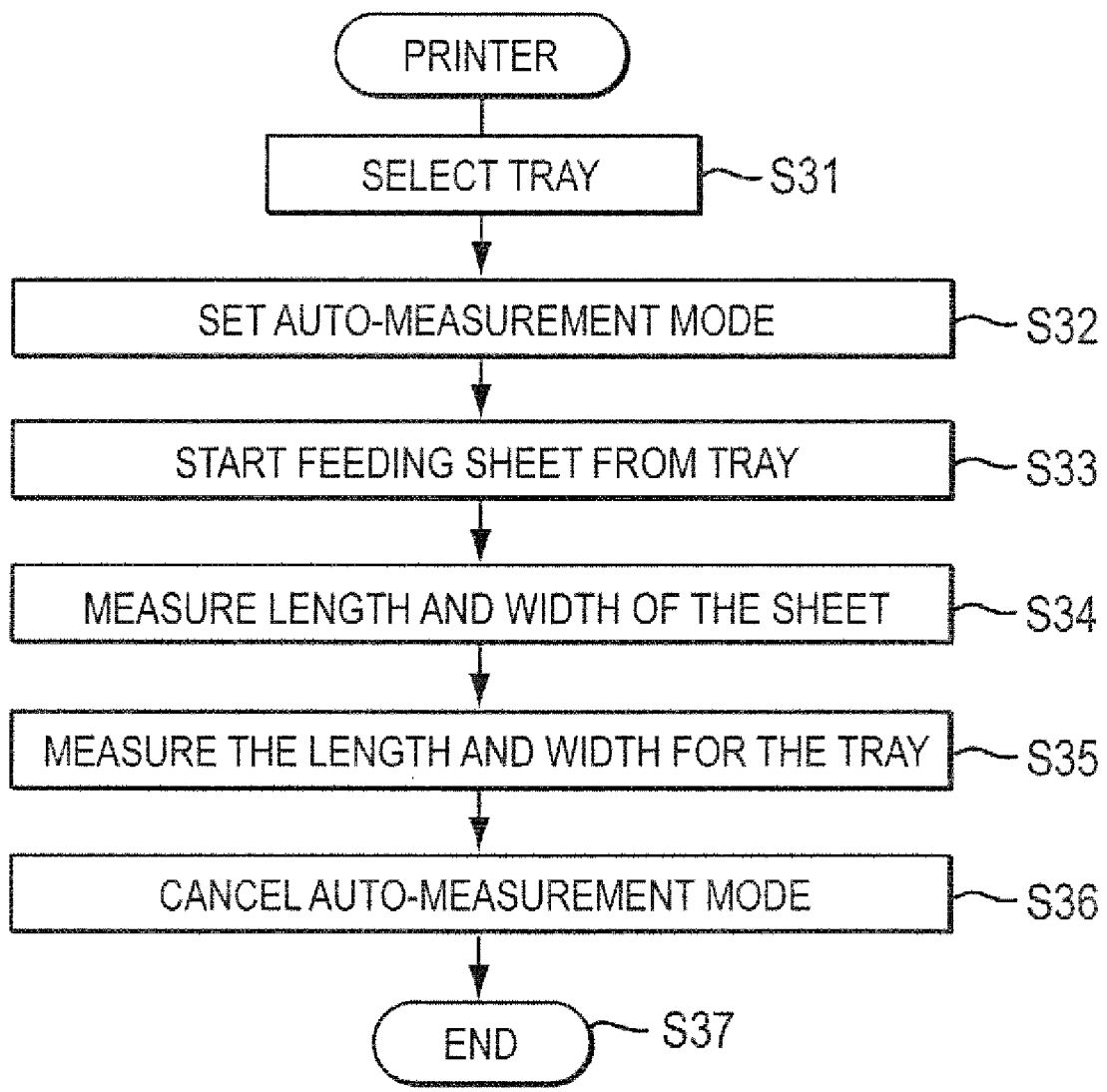
FIGS. 10(a) and 10(b) are flowcharts each showing an operation flow of an embodiment.

The procedure for the sheet size registration of the embodiment will be described referring to FIG. 10(a) which is flowchart showing an operation flow of the embodiment.

At the initiation stage, after the user installs sheets on the trays 11 of the printer 3, a correlation of sheet type with each sheet-feeding tray 11 is conducted as follows.

The user selects a button corresponding to the tray 11A and set to the A4 size and then selects a button corresponding to the tray 11B and set to the letter size for registration for A4 sized sheet on the tray 11A and letter sized sheet on the tray 11B as shown in FIG. 4.

As for two types of banner sheets, the user selects a button corresponding to the tray 11C (Step S31) and sets the auto-measurement mode by pushing the auto-measurement button 151 (Step S32). A banner sheet in the tray 11C starts to be fed through the printer as a testing sheet (Step S33) and the L-sensor 361 detects the leading edge of the sheet and the trailing edge of the sheet and W-sensor 362 detects the side edge of the sheet while the sheet is being conveyed along the sheet-feeding path 12 in order to measure the length and width of the sheet to obtain dimensions of length L1 and width W1 (Step S34). The tray 11C is correlated with the length L1 and width W1 measured in the printer 3 and the relationship is stored in the RAM 35 as a default (Step S35). Then, the registration of the length and width of the sheets in sheet-feeding tray 11C as a default has been completed. After completion of the registration, the auto-measurement mode is cancelled (Step 36) and the operation ends (Step S37).

After the registration of the length and width of the sheets is completed, the dimensions of length L1 and width W1 can be viewed on the computer screen 231 and/or the screen 152 on the control panel 15 of the printer 3.

In this case, unused devices such as the image forming section 14 for conveying the sheet and measuring the length and width are disabled during this mode.

Similarly, the user selects a button corresponding to the tray 11D (Step S31) and sets the auto-measurement mode by pushing the auto-measurement button 151 (Step S32). A banner sheet in the tray 11D starts to be fed through the printer (Step S33) and the L-sensor 361 detects the leading edge of the sheet and the trailing edge of the sheet and W-sensor 362 detects the side edge of the sheet while the sheet is being conveyed in order to measure the length and width of the sheet along the sheet-feeding path to obtain dimensions of length L2 and width W2 (Step S34). The tray 11D is correlated with the length and width measured in the printer and the relationship is stored in the RAM 35 as a default (Step S35). Then, the registration of the length and width of the sheets in sheet-feeding tray 11D as a default has been completed. After completion of the registration, the auto-measurement mode is cancelled (Step S36) and the operation ends (Step S37).

Then, correlation between tray 11C and tray 11D and the two sets of length L1 and width W1 and length L2 and width W2 has been conducted respectively and stored in the RAM 35.

After completion of the above registration of the type of the sheets or the dimensions of the sheet length and width, the user can recognize on the screen 152 the type of the sheets for the regular-sized sheets or the measured and registered length and width of the sheets for the irregular-sized sheets on each sheet-feeding tray.

Further, after completion of the above registration of the type of the sheets or the dimensions of the sheet length and width, the user can recognize on the computer monitor 231 the type of the sheet for the regular-sized sheets or the measured and registered length and width of the sheets for irregular-sized sheets on each sheet-feeding tray by using a printer driver which has been installed in the computer 2. The printer driver in the computer 2 can retrieve the attribute information of sheets from the printer through MIB (Management Information Base) service.

Of course, the control panel 11 also can be provided with conventional setting buttons for inputting manually measured dimensions of length and width of the sheet manually.

(Procedure for Printing Operation)

Figure 10B:
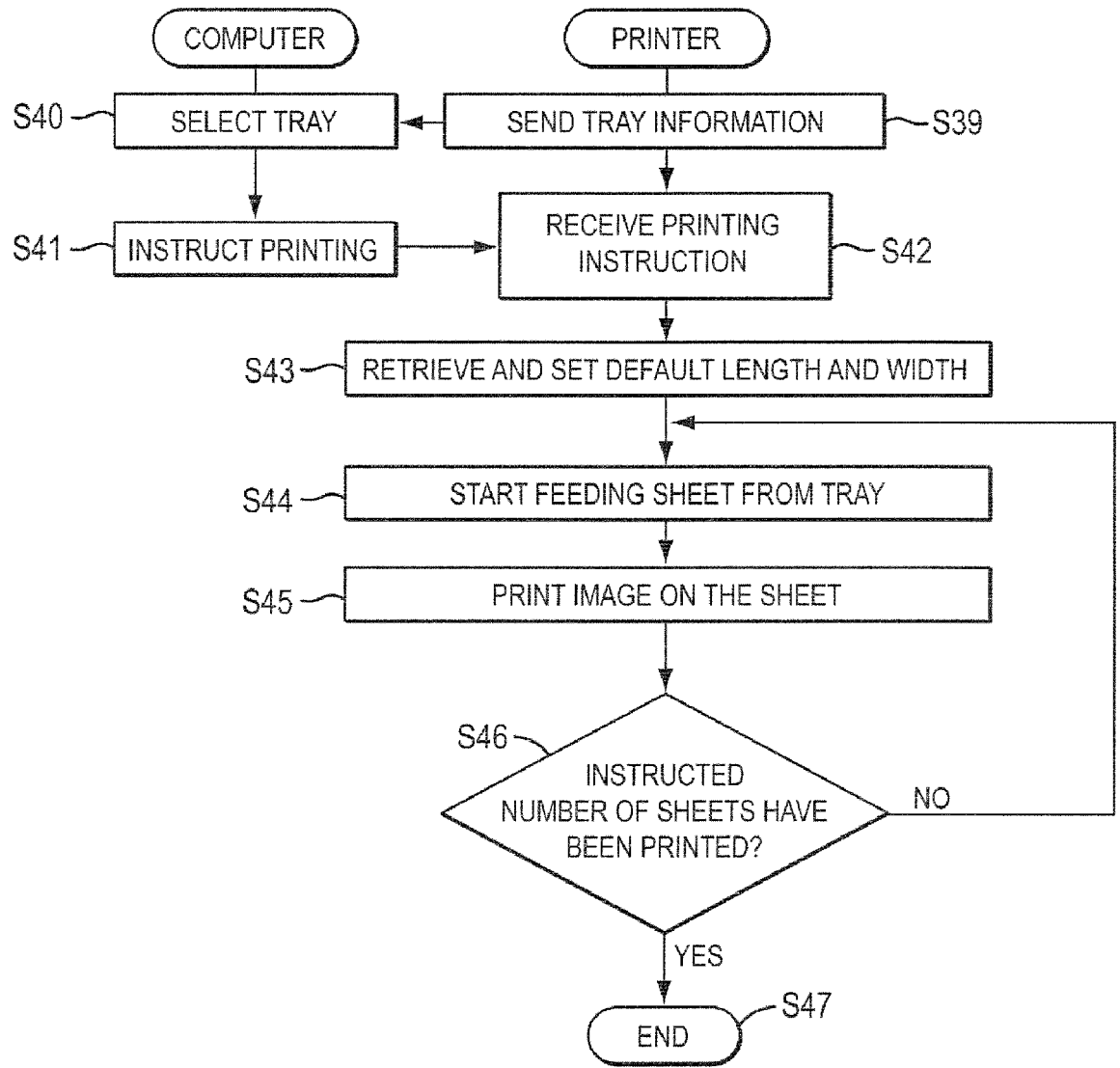

The procedure for the printing operation of the embodiment will be described referring to FIG. 10(b) which is a flowchart showing an operation flow for printing operation of the embodiment.

After the setting described above has been completed, the user operates the computer 2 to find a sheet-feeding tray suitable for the image to be printed. The CPU 21 in the computer calls and executes the printer driver corresponding to the printer 3 installed in the computer 2 for controlling the printer 3 to send information about the trays stored in RAM 35 to the computer 2 through the data communication line 4 (Step S39). Next, when the user selects tray 11C referring to the information on the monitor 231 (Step S40) and instructs to start printing (Step S41), the data of the selected tray as well as image data are converted into a form of a PDL (Page Description Language) and sent to and received by the printer 3 as a print job through the data communication line 4 (Step S42). the data of length L1 and width W1 of the default size is automatically retrieved from the RAM 35 based on the data of the selected tray and setting of the printer is carried out according to the dimensions of length L1 an width W1 (Step S43). The printer is adjusted according to the set length and width to adapt the devices or programs in the printer to the length and width so that the printer can accept the sheet having the appropriate length and width. Then, as shown in FIG. 10(b), the printer starts feeding sheet from the tray 11C (Step S44) and prints an image on it (Step S45). As shown in FIG. 10(b), if the instructed number of sheets have not been printed (Step S46: NO), the operation flow returns to Step S44. If the sheets of the instructed number have been printed (Step S46: YES), the operation ends (Step S47). The process above is repeated if the user selects tray 11D.

Embodiment 3

In the embodiments 1 and 2, an operation for sheet size registration carried out by the operation on only the printer 1 by using control panel 15 of the printer 3 was described. However, in Embodiment 3, a case where the operation for sheet size registration is controlled from the computer 2 will be described. Descriptions of sections that are similar to corresponding sections in Embodiment 1 will be omitted.

In this case, the sheet size registration is conducted by similar operation from the computer 2 through the data communication line 4.

A printer driver which has been installed in the computer 2 is executed, and the instruction screen for initial setting appears on the computer screen 231. The user selects one of the sheet-feeding trays 11 and set the auto-measurement mode by clicking the auto-measurement button on the computer screen 231. The measurement and registration of the sheet length and width is carried out in the similar manner as Embodiments 1 and 2.

Embodiment 4

Figure 11:
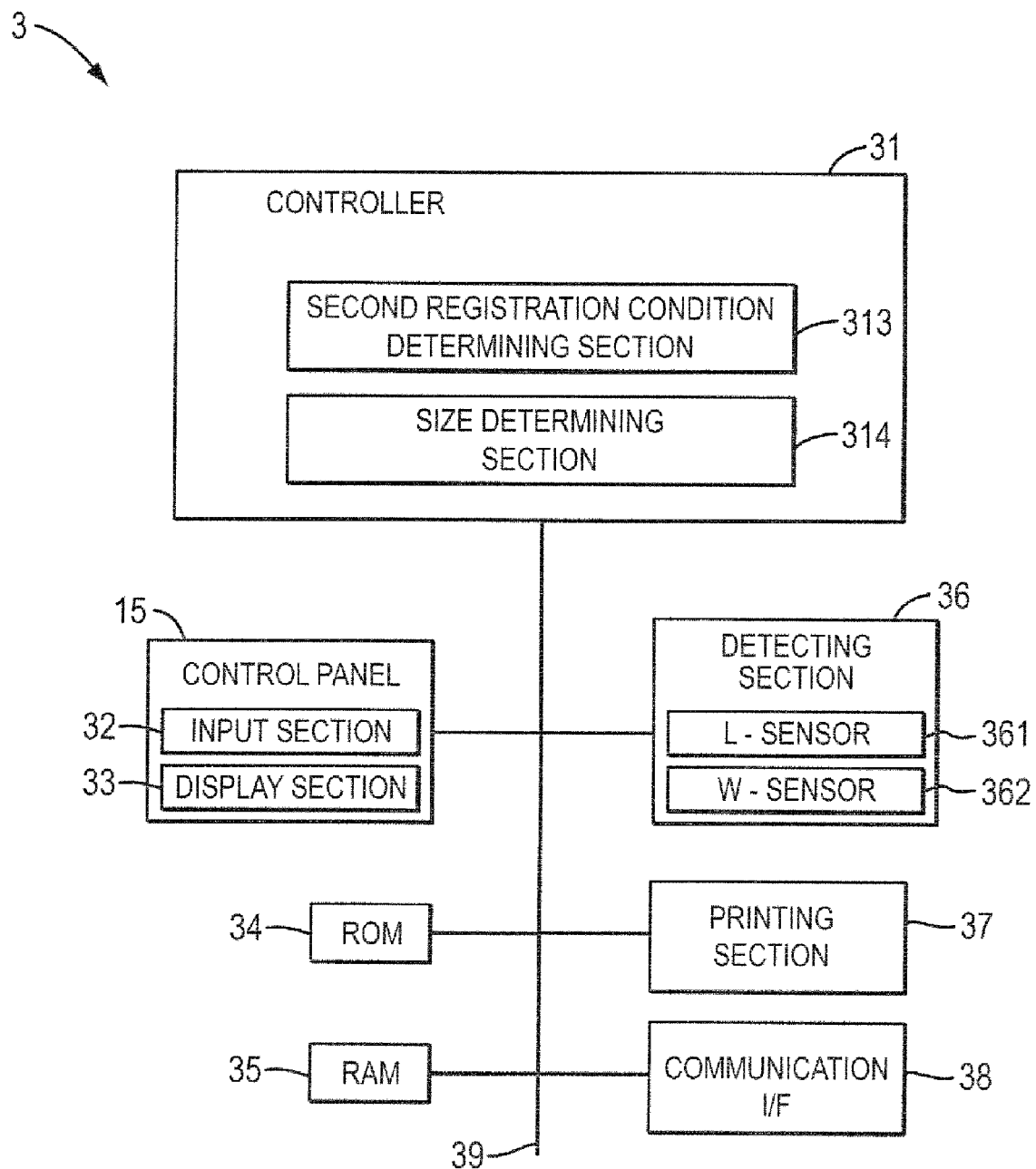
FIG. 11 is a schematic diagram of the configuration inside a printer according to an embodiment.

FIG. 11 shows the configuration inside printer of Embodiment 4. In Embodiment 4, the controller 31 has a second registration condition determining section 313 to determine whether the length and width of the irregular-sized sheet to be printed has been already registered or not. This means, whether the testing feeding for measuring the length and width of the irregular-sized sheet has been carried out or not is judged by the second registration condition determining section 313. Further a size determining section 314 is included in the controller 31 for judging whether the length and width measured by the printer 3 is a suitable for the printing instruction sent from the user. Description of sections that are similar to corresponding sections in previous Embodiments will be omitted.

Figure 12:
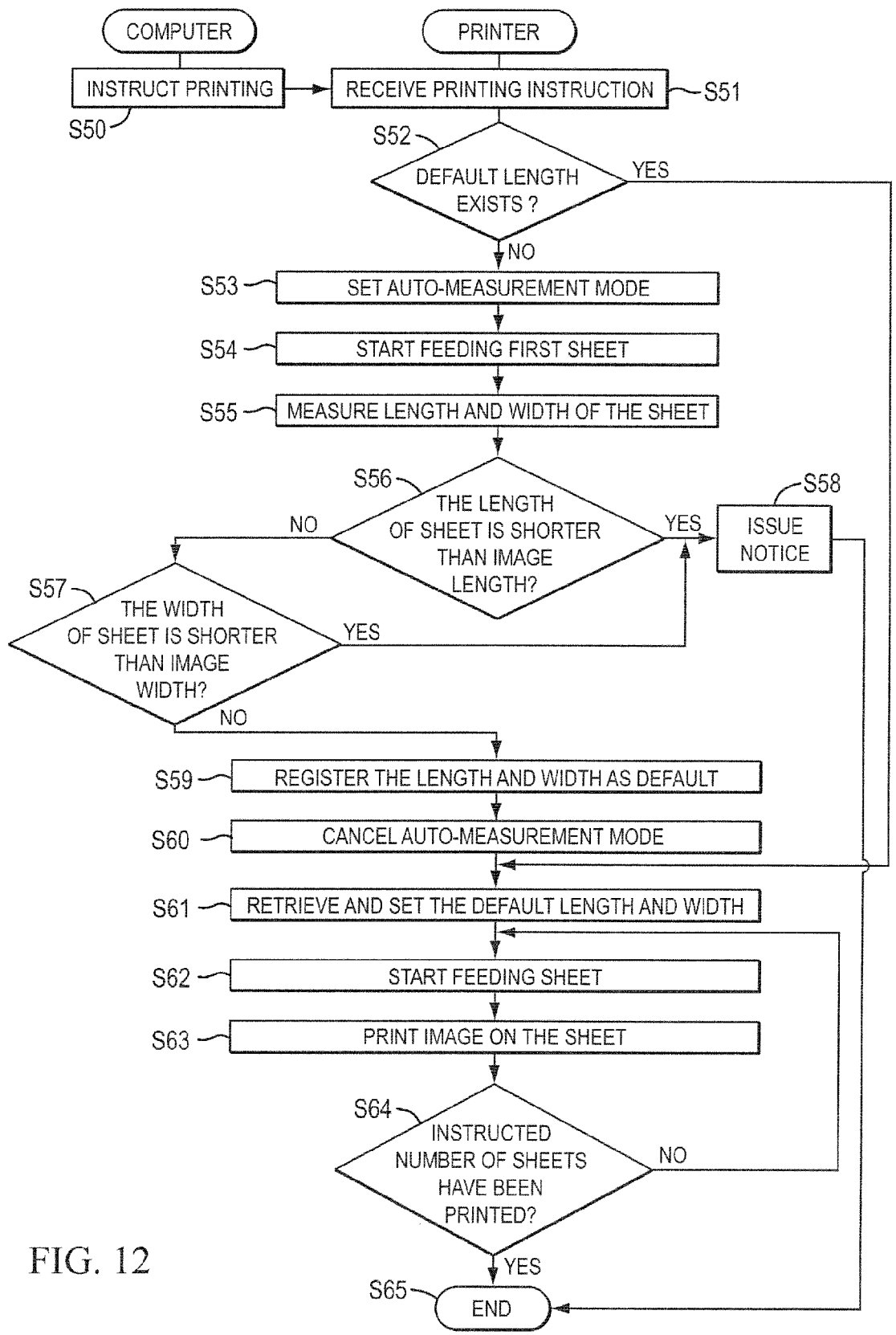
FIG. 12 is a flowchart showing an operation flow of an embodiment.

FIG. 12 is a flowchart showing an operation flow of the embodiment.

First of all, the user instructs to start printing by executing a print driver corresponding to the printer 3 and clicking the print-start button on the computer screen 231 after selection of the tray 11 if there are plural trays on the printer (Step S50). Then the printer driver sends image data and instruction data to the printer 3 as a form of a PDL (Page Description Language) and is received by the printer 3 as a print job (Step S51). Next, the second registration condition determining section 313 judges whether a default size for the tray 11 exists in the RAM 35 or not (Step S52).

If the default length exists in the RAM 35 (Step S52: YES), the process proceeds to Step S61 and start printing without a pause. If the registration of the length and width of the sheet has not been completed and there is no default size when the user clicks the print-start button (Step S52: NO), the controller 31 changes the printer to the auto-measurement mode and assigns the first sheet as a testing sheet for measuring the sheet length and width and registering the length and width (Step S53). In the printer, the first sheet is fed from the tray 11 (Step S54) and the sheet length and width are measured (Step S55).

As next step, the measured sheet length is judged by the size determining section 314 whether the measured length of the sheet is shorter than the length of an image instructed to be printed (Step S56) If the length of sheet is shorter than the length of an image to be printed (Step S56: YES), a notice is issued (Step S 58) and the operation ends (Step S65).

If the sheet length is not shorter than the image length (Step S56: NO), the measured sheet width is judged by the size determining section 314 whether the measured width of the sheet is shorter than the width of an image instructed to be printed (Step S57). If the width of sheet is shorter than the width of an image to be printed (Step S57: YES), a notice is issued (Step S58) and the operation ends (Step S65).

If the sheet width is not shorter than the image width (Step S57: NO), the measured length and width are registered as a default size to be stored in the RAM 35 (Step S59) then the auto-measurement mode is cancelled (Step S60).

After the above steps are completed, by using the second sheet on the tray 11, the printing operation starts consecutively without a pause soon after the above steps.

To be more specific, the default length is retrieved from the RAM 35 and setting of the length to the printer 3 is carried out (Step S61). Next, the feeding of the second sheet is started (Step S 62) and an image is printed on the sheet after parsing and rasterizing the print job to generate printable bitmap image data (Step S63). At Step S61, by setting the length and width to the printer 3, the printer 3 is adjusted according to the set length and width to adapt the devices or programs in the printer 3 to the length and width so that the printer can accept the sheet having the length and width without problems.

If the sheets of the instructed number have not been printed (Step S64: NO), the operation flow returns to Step S62. If the sheets of the instructed number have not been printed (Step S64: YES), the operation ends (Step S65).

In this case the user checks the dimension of the length and width which have just been measured by the printer 3 and displayed on the computer screen 231 and can take some action such as selecting another set of sheets. After measurement of the sheet length and width, the dimensions can be viewed on the computer screen 231 and/or the screen 152 on the control panel 15 of the printer 3.

Especially for Embodiment 4, an auto-resetting function of the sheet size registration is recommended so that once the sheet-feeding tray is emptied, the registration of the sheet length and width is reset and the default size is cancelled. However, auto-resetting may also be applied to other embodiments such as embodiment 2. A conventional type of sensor in detecting section 36 on the tray 11 can be used for detecting the emptiness such as 363a, 363b, 363c and 363d in FIG. 4. Of course, a reset button for resetting the registered default size and/or a default keeping button for keeping the default size even if a set of sheets is replaced by another set of sheets in the tray 11 can be provided in the control panel 15.

This system is especially useful in the case where a trimming of the printed sheet to the suitable length and width is scheduled after the printing. The user prepares one of proper sheets whose length and width include margins for trimming. The user does not know the exact length or width of the prepared sheet on which an image will be printed because the sheet will be trimmed according to the image size after the printing.

Even in this case the printer needs to know exact length or width of the sheet to be used for a proper operation without sheet jamming or others.

The user only set a proper sheet in a sheet-feeding tray and instructs start of the printing, the printer automatically determines whether the size registration has been finished. Then, if the registration has not finished, the controller 31 assigns the first sheet as the testing sheet and feeds the testing sheet for measuring the length of the sheet. Then next, the length and width are registered similarly to Embodiment 2.

Users need not to care about the exact length and width of the sheet because the printer itself measures the exact length and width of the sheet and the user need not to conduct a measuring operation separated from the printing operation like Embodiments 1 to 3.

As an option, a size difference determining section can be provided which judges whether the difference of length or width between the image to be printed and the sheet to be used is shorter than a predetermined value so as to prevent too large sheets relative to the image from being used.

Embodiment 4 is useful especially for printing irregular-sized sheets in the case where the user prints various sizes of sheets and/or various qualities of sheets and when each copy number is small so that the user must frequently change sets of sheets on the tray 11. Embodiment 4 saves time spent for separate two-step operation composed of the measuring operation and the printing operation.

Embodiment 5

Figure 13:
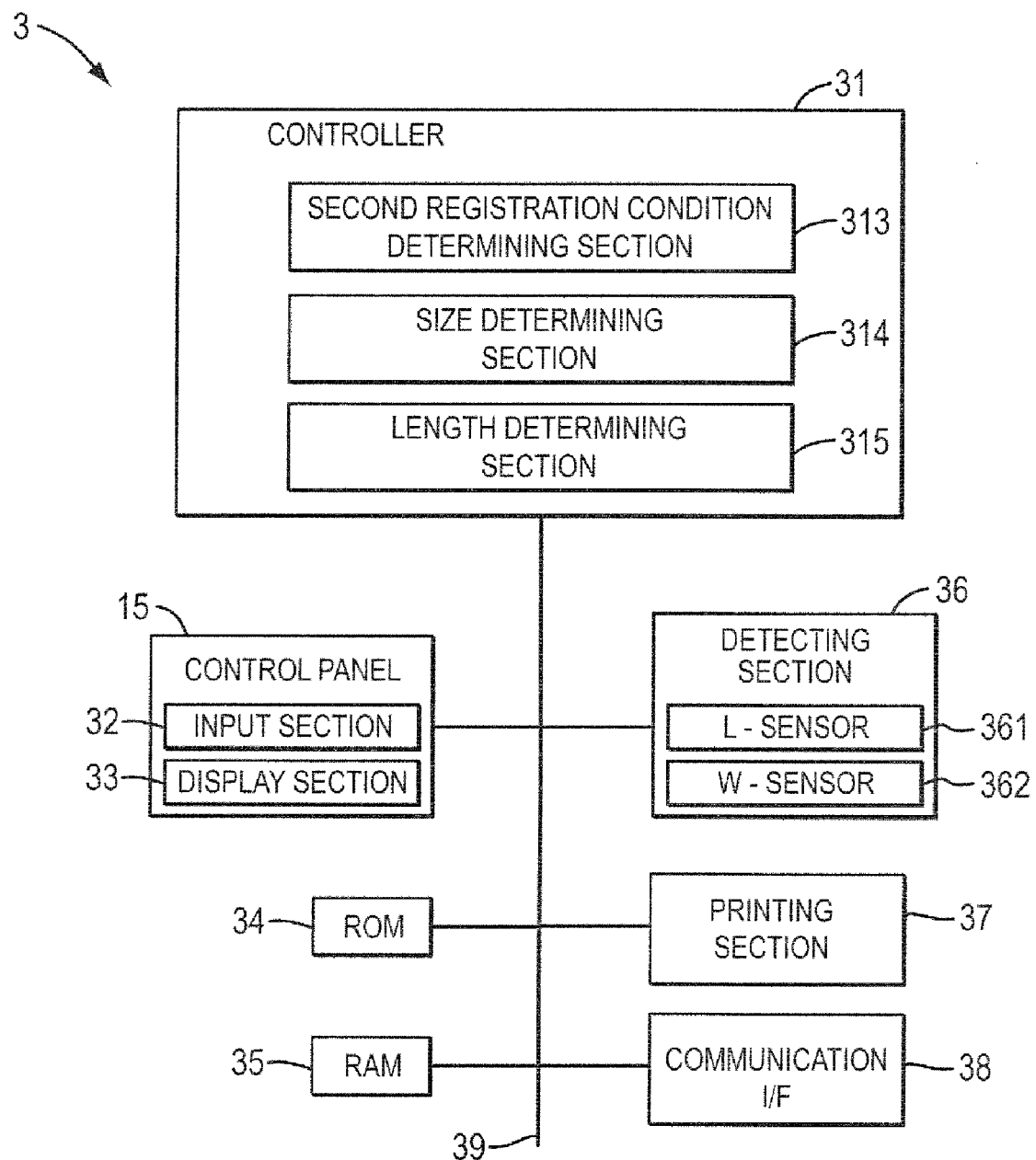
FIG. 13 is a schematic diagram of the configuration inside a printer according to an embodiment.

Embodiment 5 is a further modification of Embodiment 4. FIG. 13 shows the configuration inside the printer 3 of Embodiment 5. In this embodiment, the controller 31 has further the length determining section 315 to determine whether the measured length is shorter than the predetermined length or not. Description of portions that are common to previously described embodiments will be omitted.

Figure 14:
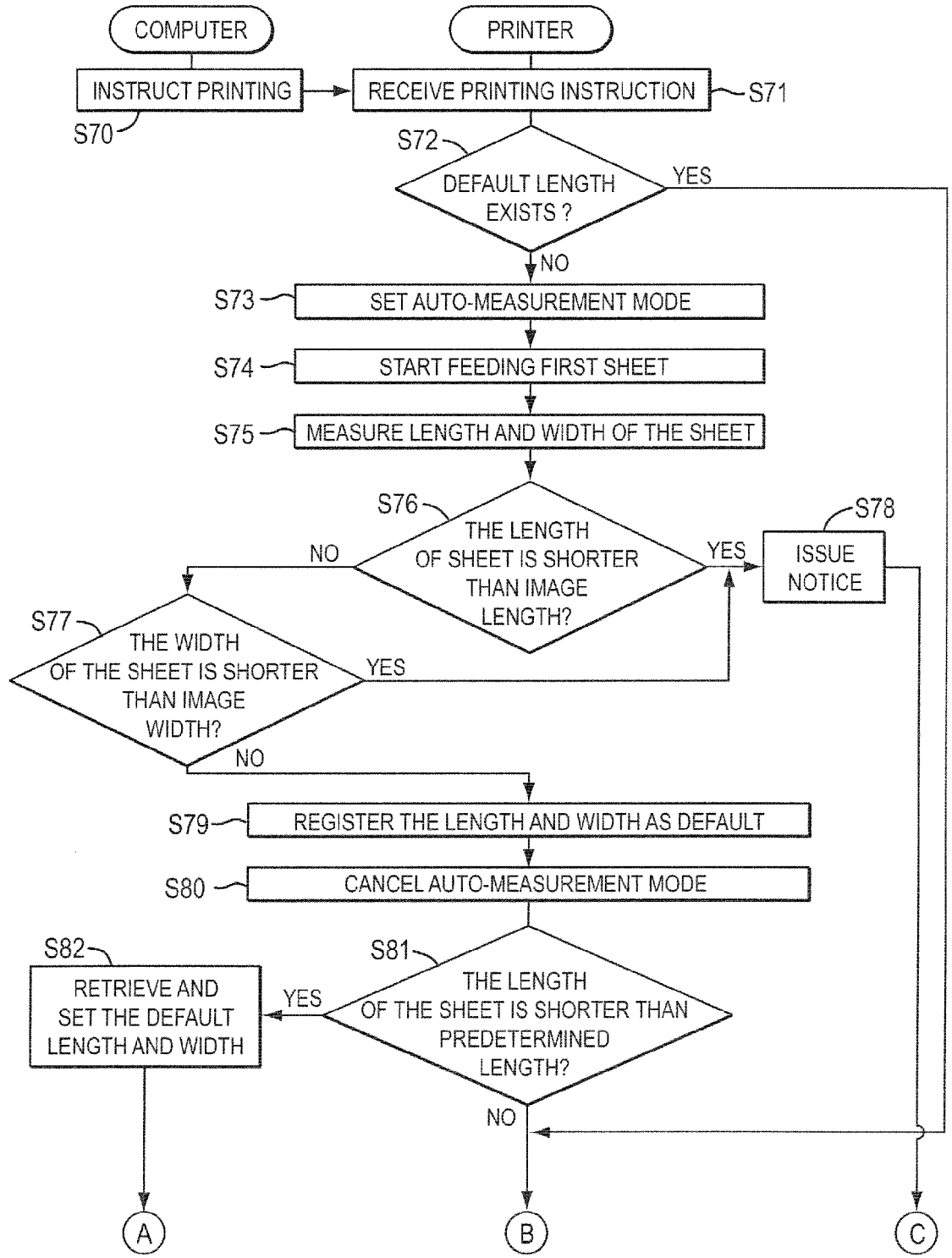
FIG. 14 is a flowchart showing an operation flow of an embodiment.
Figure 14:
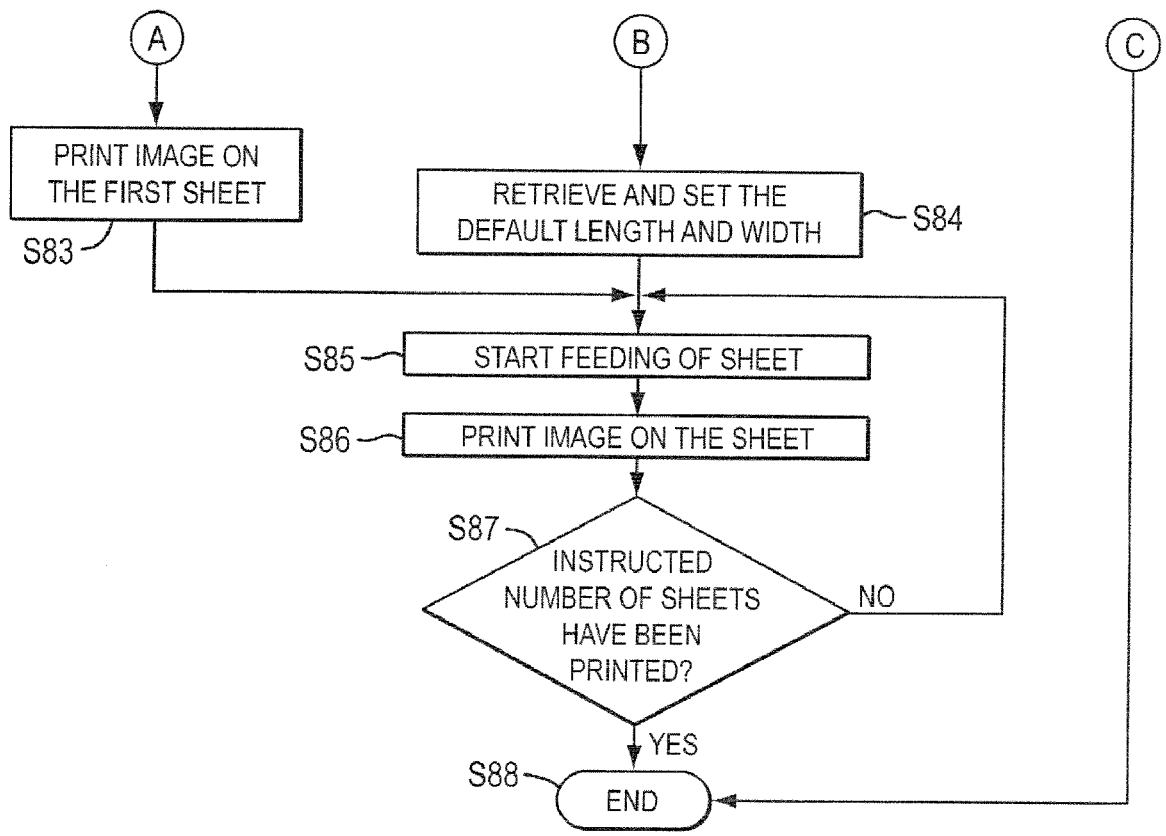

FIG. 14 is a flowchart showing an operation flow of the embodiment. The functions performed in Steps S70 through S80 are the same as those performed in steps S50 through S60 of Embodiment 4 in FIG. 12. In step S81, the length determining section 315 judges whether the length of the sheet which is in the sheet feeding direction is shorter than a predetermined length preset in advance. If the length of the sheet is shorter than a predetermined length (Step S81: YES), automatically the controller 31 retrieves and sets the default length (Step S82) and starts printing an image on the sheet whose length and width have been just measured (Step S83).

If the length of the sheet is not shorter than a predetermined length (Step S81: NO), Steps S84, S85, S86 and S87 which are the same as Steps S61, S62, S63 and S64 of Embodiment 4 are taken.

The predetermined length may be a length determined at the designing stage of the printer 3 according to the structure and ability of the printer 3.

Embodiment 5 is useful especially for printing relatively short irregular-sized sheets in the case where the user prints various sizes of sheets and/or various qualities of sheets and when each copy number is small so that the user must frequently change sets of sheets on the tray 11. Embodiment 5 saves time spent for feeding sheets through the printer 3 only for measuring the sheet size.

In this case, the L-sensor 361 for measuring the sheet length and W-sensor 362 for measuring the sheet width are recommended to be provided at positions as more upstream as possible along the sheet-feeding path 12.

Although the present invention has been illustrated and described with reference to the exemplified embodiments of the present invention, the present invention is not limited thereto It should be understood that various changes and modifications can be made thereto without departing from the spirit and scope of the present invention.

The embodiments were described for a printer, however the present invention can be employed for various types of imaging apparatuses such as scanners, copy machines, multifunctional printers.

What is claimed is:

1. An imaging system for forming an image on a sheet, the system comprising:
a computer for creating data of an image for printing; and
an imaging apparatus for forming the image on a sheet, wherein the imaging apparatus comprises:
a sheet-feeding path for conveying the sheet;
a detecting section positioned along the sheet-feeding path for detecting a leading edge, a trailing edge and a side edge of the sheet while the sheet is being conveyed along the sheet-feeding path; and
a controller for registering a dimension,
a memory for storing data of dimensions,
wherein, the detecting section detects the leading edge, the trailing edge and the side edge of the sheet while the sheet is being conveyed along the sheet-feeding path and the controller obtains dimensions of a length and a width of the sheet, and then the controller registers the dimensions of the length and the width of the sheet to be stored in the memory as data, wherein the controller comprises:

a sheet type determining section which judges whether the dimensions of the measured length and width are equal to dimensions of length and width of a regular sized-sheet by comparing the dimensions of the measured length and width with the dimensions of the regular sized-sheets whose data have been previously stored in the memory; and a registration condition determining section, which judges whether data of dimensions of length and width equal to the dimensions of the measured length and width exist in the memory.

2. The imaging system of claim 1, wherein the detecting section is adapted to measure the length and to detect arrival of the sheet at a position to permit further control of the imaging apparatus.

3. The imaging system of claim 1, wherein the imaging apparatus further comprises an imaging section at which the image is transferred to the sheet, and wherein the sheet-feeding path conveys the sheet through the image forming section.

4. An imaging system for forming an image on a sheet, the system comprising, a computer for creating data of an image for printing; and an imaging apparatus for forming the image on a sheet, wherein the imaging apparatus comprises:

a sheet-feeding path for conveying the sheet;

a sheet-feeding tray for feeding the sheet to the sheet-feeding path;

a detecting section positioned along the path for detecting a leading edge, a trailing edge and a side edge of the sheet while the sheet is being conveyed along the sheet-feeding path; and a controller for registering a dimension; and a memory for storing data of dimensions;

wherein, the detecting section detects the leading edge, the trailing edge and the side edge of the sheet while the sheet is being conveyed along the sheet-feeding path and the controller obtains dimensions of a length and a width of the sheet, and then the controller registers the dimensions of the length and the width of the sheet to be stored in the memory as data, and wherein when an auto-measurement mode is set in the controller, the controller controls the detecting section so as to detect the leading edge, the trailing edge and the side edge of the sheet while the sheet is being conveyed along the sheet-feeding path in a sheet feeding direction from the sheet-feeding tray and obtains dimensions of a length in the sheet feeding direction and a width of the sheet, and then the controller registers the dimension of the length and the width of the sheet as a default dimension for the sheet-feeding tray to be stored in the memory.

5. The imaging system of claim 4, further comprising:

a second registration condition determination section, which determines whether the data of the default length and width exist in the memory; and a size determining section, which determines whether the obtained length or width of the sheet are shorter than a length and a width of the image to be printed.

6. The imaging system of claim 5, further comprising:

a length determining section, which determines whether the obtained length of the sheet is shorter than a predetermined length.

7. The imaging system of claim 4, further comprising:

an emptiness detector for detecting an empty sheet-feeding tray, wherein the controller is configured to reset the default dimensions associated with the sheet-feeding tray when the emptiness detector detects an empty sheet-feeding tray.

8. The imaging system of claim 4, wherein when the controller receives a print start instruction, the controller retrieves the data of the length and width from the memory and sets the length and width to the printer so that the printer is adjusted according to the default dimension.

9. The imaging system of claim 4, wherein the imaging apparatus further comprises an imaging section at which the image is transferred to the sheet, and wherein the sheet-feeding path conveys the sheet through the image forming section.

10. An imaging apparatus for forming an image on a sheet, the apparatus comprising:

a sheet-feeding path for conveying the sheet;

a detecting section positioned along the sheet-feeding path for detecting a leading edge, a trailing edge and a side edge of the sheet while the sheet is being conveyed along the sheet-feeding path; and a controller for registering at least one dimension of the sheet, a memory for storing dimensions data, wherein the detecting section detects the leading edge, the trailing edge and the side edge of the sheet while the sheet is being conveyed along the sheet-feeding path and the controller obtains dimensions of a length and a width of the sheet, and then the controller registers the dimensions of the length and the width of the sheet to be stored in the memory as data, wherein the controller comprises:

a sheet type determining section, which judges whether the dimensions of the measured length and width are equal to dimensions of length and width of a regular sized-sheet by comparing the dimensions of the measured length and width with the dimensions of the regular sized-sheets whose data have been previously stored in the memory; and a registration condition determining section, which judges whether data of dimensions of length and width equal to the dimensions of the measured length and width exist in the memory.

11. The imaging apparatus of claim 10, further comprising:

an imaging section at which the image is transferred to the sheet, wherein the sheet-feeding path conveys the sheet through the image forming section.

12. An imaging apparatus for forming an image on a sheet, the apparatus comprising, a sheet-feeding path for conveying the sheet;

a sheet-feeding tray for feeding the sheet to the sheet-feeding path;

a detecting section positioned along the sheet-feeding path for detecting a leading edge, a trailing edge and a side edge of the sheet while the sheet is being conveyed along the sheet-feeding path;

a controller for registering at least one dimension of the sheet;

a memory for storing dimensions data;

wherein the detecting section detects the leading edge, the trailing edge and the side edge of the sheet while the sheet is being conveyed along the sheet-feeding path and the controller obtains dimensions, of a length and a width of the sheet, and then the controller registers the dimensions of the length and the width of the sheet to be stored in the memory as data, wherein when an auto-measurement mode is set in the controller, the controller controls the detecting section so as to detect the leading edge, the trailing edge and the side edge of the sheet while the sheet is being conveyed along the sheet-feeding path in a sheet feeding direction from the sheet-feeding tray and obtains dimensions of a length in the sheet feeding direction and a width of the sheet, and then the controller registers the dimensions of the length and the width of the sheet as a default dimension for the sheet-feeding tray to be stored in the memory.

13. The imaging apparatus of claim 12, further comprising:
a second registration condition determination section, which determines whether the data of the default length and width exist in the memory; and
a size determining section, which determines whether the obtained length or width of the sheet are shorter than a length and a width of the image to be printed.

14. The imaging apparatus of claim 13, further comprising:
a length determining section, which determines whether the obtained length of the sheet is shorter than a predetermined length.

15. The imaging apparatus of claim 12, further comprising:
an emptiness detector for detecting an empty sheet-feeding tray,
wherein the controller is configured to reset the default dimensions associated with the sheet-feeding tray when the emptiness detector detects an empty sheet-feeding tray.

16. The imaging apparatus of claim 12, further comprising:
an imaging section at which the image is transferred to the sheet,
wherein the sheet-feeding path conveys the sheet through the image forming section.

17. An imaging method for forming an image on a sheet, the method comprising the steps of:
conveying the sheet along a sheet-feeding path;
detecting a leading edge, a trailing edge and a side edge of the sheet while the sheet is being conveyed along the sheet-feeding path;
obtaining dimensions of a length and a width of the sheet;
judging whether the dimensions of the measured length and width are equal to dimensions of length and width of a regular sized-sheet by comparing the dimensions of the measured length and width with the dimensions of the regular sized-sheets whose data have previously been stored in the memory;
judging whether data of dimensions of length and width equal to the dimensions of the measured length and width exist in the memory; and
registering the dimensions of the length and the width of the sheet to be stored in a memory as data.

18. The imaging method of claim 17, wherein the sheet-feeding path conveys the sheet through an image forming section at which the image is transferred to the sheet.

19. An imaging method for forming an image on a sheet, the method comprising the steps of:
placing a sheet on a sheet-feeding tray for feeding the sheet to a sheet-feeding path,
conveying the sheet along a sheet-feeding path;
detecting a leading edge, a trailing edge and a side edge of the sheet while the sheet is being conveyed along the sheet-feeding path;
obtaining dimensions of a length and a width of the sheet; and
registering the dimensions of the length and the width of the sheet to be stored in a memory as data,
wherein a leading edge, a trailing edge and a side edge of the sheet are detected while the sheet is being conveyed along the sheet-feeding path in a sheet feeding direction from the sheet-feeding tray in the detecting step,
dimensions of a length in the sheet feeding direction and a width of the sheet are obtained in the obtaining step, and
the dimensions of the length and the width of the sheet are registered as a default dimension for the sheet-feeding tray, to be stored in the memory in the registering step.

20. The imaging method of claim 19, further comprising:
determining whether the data of the default length and width exists in the memory; and
determining whether the obtained length or width of the sheet is shorter than a length and a width of the image to be printed.

21. The imaging method of claim 20, further comprising:
determining whether the obtained length of the sheet is shorter than a predetermined length.

22. The imaging method of claim 19, further comprising:
detecting an empty sheet-feeding tray,
resetting the default dimensions associated with the sheet-feeding tray when an empty sheet-feeding tray is detected.

23. The imaging method of claim 19, wherein the sheet-feeding path conveys the sheet through an image forming section at which the image is transferred to the sheet.

* * * * *